(12) United States Patent
Cho et al.

(10) Patent No.: US 10,276,847 B2
(45) Date of Patent: Apr. 30, 2019

(54) RECHARGABLE BATTERY PACK

(71) Applicant: SAMSUNG SDI CO., LTD., Yongin-si, Gyeonggi-do (KR)

(72) Inventors: Kyung-Ho Cho, Yongin-si (KR); Byung-Don Kwon, Yongin-si (KR); Ji-Soon Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 277 days.

(21) Appl. No.: 15/232,688

(22) Filed: Aug. 9, 2016

(65) Prior Publication Data
US 2017/0062782 A1 Mar. 2, 2017

(30) Foreign Application Priority Data
Aug. 28, 2015 (KR) .................. 10-2015-0121993

(51) Int. Cl.
| | | |
|---|---|---|
| *H01M 2/10* | (2006.01) | |
| *H01M 2/20* | (2006.01) | |
| *H01M 10/04* | (2006.01) | |
| *H01M 2/16* | (2006.01) | |

(52) U.S. Cl.
CPC ....... *H01M 2/1077* (2013.01); *H01M 2/1083* (2013.01); *H01M 2/1653* (2013.01); *H01M 2/206* (2013.01); *H01M 10/04* (2013.01); *H01M 2220/20* (2013.01)

(58) Field of Classification Search
None
See application file for complete search history.

(56) References Cited

U.S. PATENT DOCUMENTS

| | | |
|---|---|---|
| 2011/0135985 A1 | 6/2011 | Kim |
| 2011/0293973 A1 | 12/2011 | Kim |
| 2013/0095359 A1 | 4/2013 | Yoshioka et al. |
| 2014/0023893 A1* | 1/2014 | Shimizu .............. H01M 2/1077 429/72 |
| 2014/0120391 A1 | 5/2014 | Park |
| 2015/0037631 A1 | 2/2015 | Lee et al. |
| 2015/0064523 A1 | 3/2015 | Lim |
| 2015/0162639 A1 | 6/2015 | Lee |
| 2016/0149180 A1 | 5/2016 | Tokoo et al. |

FOREIGN PATENT DOCUMENTS

| | | |
|---|---|---|
| JP | 2013-54869 A | 3/2013 |
| JP | 2015-5262 A | 1/2015 |
| JP | 2015-5362 A | 1/2015 |

(Continued)

OTHER PUBLICATIONS

KIPO Office Action dated Apr. 27, 2017, for corresponding Korean Patent Application No. 10-2015-0121993 (8 pages).

(Continued)

*Primary Examiner* — Daniel S Gatewood
(74) *Attorney, Agent, or Firm* — Lewis Roca Rothgerber Christie LLP

(57) ABSTRACT

A rechargeable battery pack including unit cells each including a rechargeable battery, barriers coupled to each other at an outer circumference of the unit cells and each located between respective ones of the unit cells, and a pack housing that accommodates the unit cells and the barriers, and that is coupled to the barriers by tight-fitting.

20 Claims, 11 Drawing Sheets

(56) References Cited

FOREIGN PATENT DOCUMENTS

| KR | 10-2011-0062851 A | 6/2011 |
|---|---|---|
| KR | 10-2011-0129799 | 12/2011 |
| KR | 10-2013-0007864 A | 1/2013 |
| KR | 10-2013-0035244 | 4/2013 |
| KR | 10-2014-0055135 | 5/2014 |
| KR | 10-2015-0016895 | 2/2015 |
| KR | 10-2015-0067453 A | 6/2015 |

OTHER PUBLICATIONS

KIPO Notice of Allowance dated Dec. 15, 2017, for corresponding Korean Patent Application No. 10-2015-0121993 (5 pages).
EPO Office Action dated Jan. 22, 2018, for corresponding European Patent Application No. 16185875.8 (4 pages).
EPO Extended Search Report dated Nov. 10, 2016, for corresponding European Patent Application No. 16185875.8 (7 pages).
EPO Office Action dated Jul. 30, 2018, for corresponding European Patent Application No. 16185875.8 (3 pages).

\* cited by examiner

RECHARGABLE BATTERY PACK

CROSS-REFERENCE TO RELATED APPLICATION

This application claims priority to, and the benefit of, Korean Patent Application No. 10-2015-0121993, filed in the Korean Intellectual Property Office on Aug. 28, 2015, the entire contents of which are incorporated herein by reference.

BACKGROUND

1. Field

The present disclosure relates to a rechargeable battery pack including a plurality of unit cells.

2. Description of the Related Art

A rechargeable battery differs from a primary battery in that the former can be repeatedly charged and discharged, while the latter is incapable of being recharged. Low-capacity rechargeable batteries are used in small portable electronic devices, such as mobile phones, notebook computers, and camcorders, while high-capacity rechargeable batteries can be used as a power source for driving motors of a hybrid vehicle, an electric vehicle, and the like.

The rechargeable battery may be used in small electronic devices as a single cell battery, or may be used in motor-driving power sources, and may be used as a battery module in which a plurality of battery cells are electrically connected, or may be used as a battery pack in which a plurality of battery modules are electrically connected.

For example, a rechargeable battery pack may be formed by inserting a battery module into a pack-housing to be coupled thereto, and may be formed after forming the battery module by forming a cell stack by alternately stacking unit cells and barriers, and by then assembling a module frame at an outer circumference of the cell stack.

Such a rechargeable battery pack is formed by separately preparing a pack-housing and a battery module, and by then assembling the battery module into the pack-housing. Accordingly, the number of parts included in a rechargeable battery pack, material costs thereof, complication of manufacturing processes thereof, and a weight thereof, all increase.

The above information disclosed in this Background section is only to enhance the understanding of the background of the disclosure, and therefore it may contain information that does not form the prior art.

SUMMARY

Embodiments of the present disclosure provide a rechargeable battery pack in which a module frame is removed, and in which barriers provided between a plurality of unit cells are directly inserted and fixed into a pack housing.

An exemplary embodiment of the present disclosure provides a rechargeable battery pack including unit cells each including a rechargeable battery, barriers coupled to each other at an outer circumference of the unit cells and each located between respective ones of the unit cells, and a pack housing that accommodates the unit cells and the barriers, and that is coupled to the barriers by tight-fitting.

Each of the barriers may include a main body between the respective ones of the unit cells, side surface supporting portions at opposite ends of the main body to support outer surfaces of opposite sides of the respective ones of the unit cells, and first plastic-deformed portions that respectively protrude from the side surface supporting portions to be plastic-deformed inside the pack housing.

An inner surface of the pack housing may define a guide groove extending in an insertion direction of the first plastic-deformed portion that is configured to guide insertion of the first plastic-deformed portion.

The main body may include an absorbing portion that is concave toward a side of one of the unit cells in a swelling direction of the one of the unit cells, and that is configured to accommodate swelling deformation of the one of the unit cells into an air gap spaced from the unit cell.

The barriers include an end barrier for supporting an outermost unit cell of the unit cells, the end barrier including a supporting portion that protrudes in a swelling direction of the outermost unit cell, and that is configured to be plastic-deformed toward an inner surface of the pack housing.

The end barrier may include an end absorbing portion for accommodating swelling deformation of the unit cell that is at a second distance from an inner surface of the pack housing, the second distance being less than a first distance of the supporting portion from the inner surface of the pack housing.

The end barrier may include an absorbing portion that is concave toward the outermost unit cell to accommodate a swelling deformation of the outermost unit cell into an air gap adjacent the unit cell.

The supporting portion may include a downward supporting portion below the end absorbing portion, an upward supporting portion above the end absorbing portion, and a second plastic-deformed portion adjacent the end absorbing portion and protruding in a swelling direction of the unit cell to be plastic-deformed within the pack housing.

The supporting portion may have an inclined surface that is inclined by the first distance in an insertion direction with respect to an outer surface of the end barrier.

The barrier may include a bottom surface supporting portion for supporting a downward outer surface of the unit cells, and a third plastic-deformed portion that protrudes from the bottom surface supporting portion, and that is configured to be plastic-deformed to be fixed inside the pack housing.

The pack housing may include a fixing portion protruding toward the third plastic-deformed portion from a bottom surface thereof to contact the third plastic-deformed portion.

The bottom surface supporting portion may include a first supporting layer for contacting and supporting the bottom surface of the unit cell, and a second supporting layer that is connected to the first supporting layer to contact and support the pack housing.

The third plastic-deformed portion may protrude toward the fixing portion of the pack housing from the second supporting layer.

The barrier and the pack housing may include a synthetic resin, and the third plastic-deformed portion of the barrier may be bonded to the fixing portion to form a first bonding portion.

The pack housing may be integrally formed to be fixedly connected to the barrier.

The rechargeable battery pack may further include a bus bar holder coupled to the pack housing to cover the unit cells and including a synthetic resin, and a housing cover coupled to an outside of the bus bar holder and to the pack housing and including a synthetic resin, wherein the bus bar holder is bonded to an inward protrusion of the pack housing to form a second bonding portion, and wherein the housing cover is bonded to an outward flange of the pack housing to form a third bonding portion.

The pack housing may be configured to be directly mounted on a hybrid vehicle or to an electric vehicle.

Another exemplary embodiment of the present disclosure provides a rechargeable battery pack including unit cells each including a rechargeable battery, barriers between respective ones of the unit cells and coupled to each other at an outer circumference of the unit cells, and a pack housing that accommodates a cell stack including the unit cells and the barriers and is bonded to the barriers.

The barriers and the pack housing may include a synthetic resin, and are bonded to each other to form a first bonding portion.

The rechargeable battery pack may further include a bus bar holder that is coupled to the pack housing to cover the unit cells and that includes a synthetic resin, and a housing cover that is coupled to an outside of the bus bar holder and to the pack housing and that includes a synthetic resin, wherein the bus bar holder is bonded to an inward protrusion of the pack housing to form a second bonding portion, and wherein the housing cover is bonded to an outward flange of the pack housing to form a third bonding portion.

According to embodiments of the present disclosure, it is possible to eliminate a module frame by accommodating a cell stack assembled with unit cells and barriers in a pack housing, and by tight-fitting the barriers and the pack housing to be coupled.

That is, according to embodiments of the present disclosure, it is possible to reduce the number of parts included in the rechargeable battery pack, the material costs thereof, and the weight thereof, and it is also possible to simplify the manufacturing process thereof.

DETAILED DESCRIPTION

Figure 1:
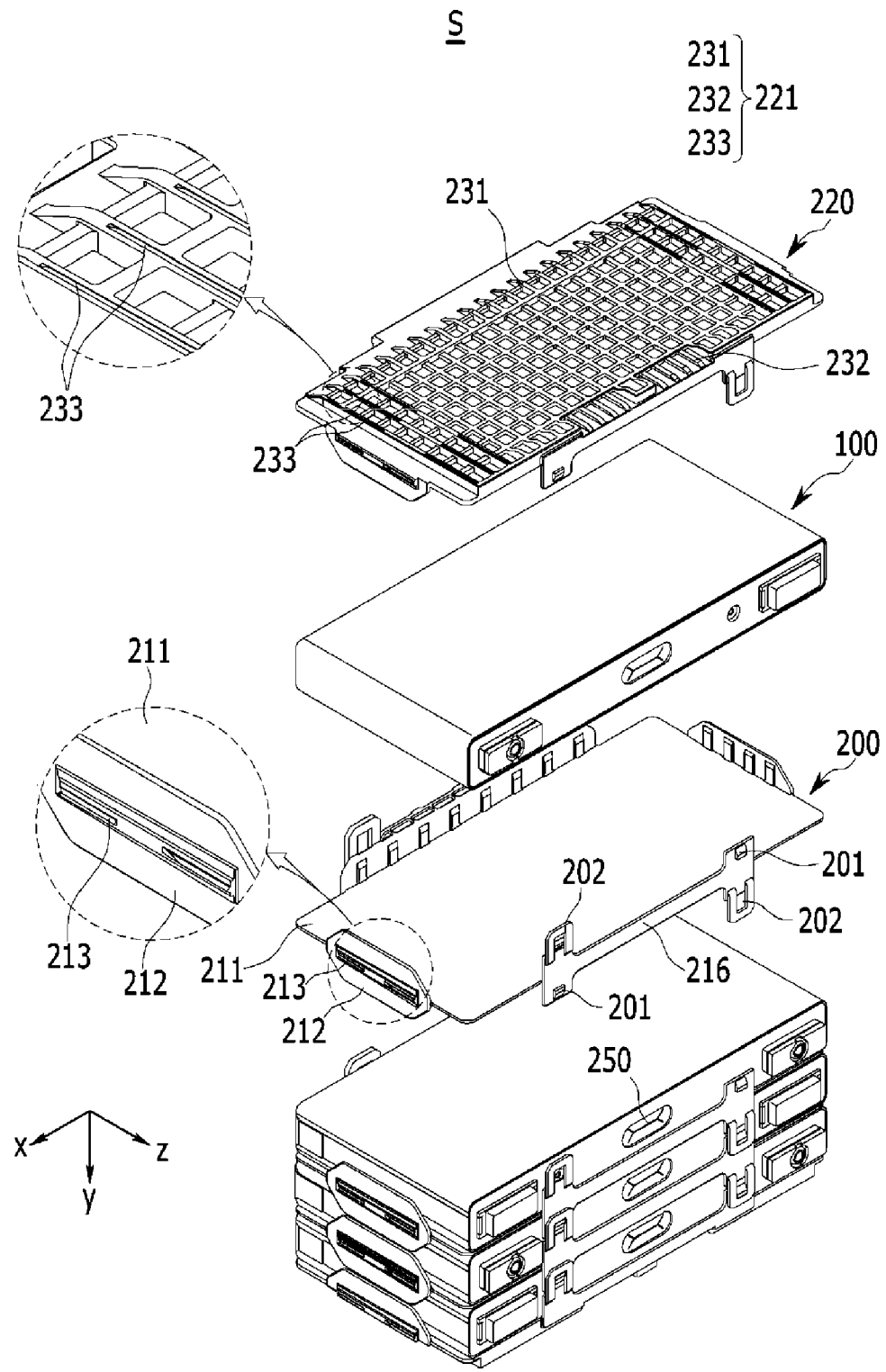
FIG. 1 is a perspective view illustrating a cell-stacking process for manufacturing a rechargeable battery pack according to an exemplary embodiment of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including,"

when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
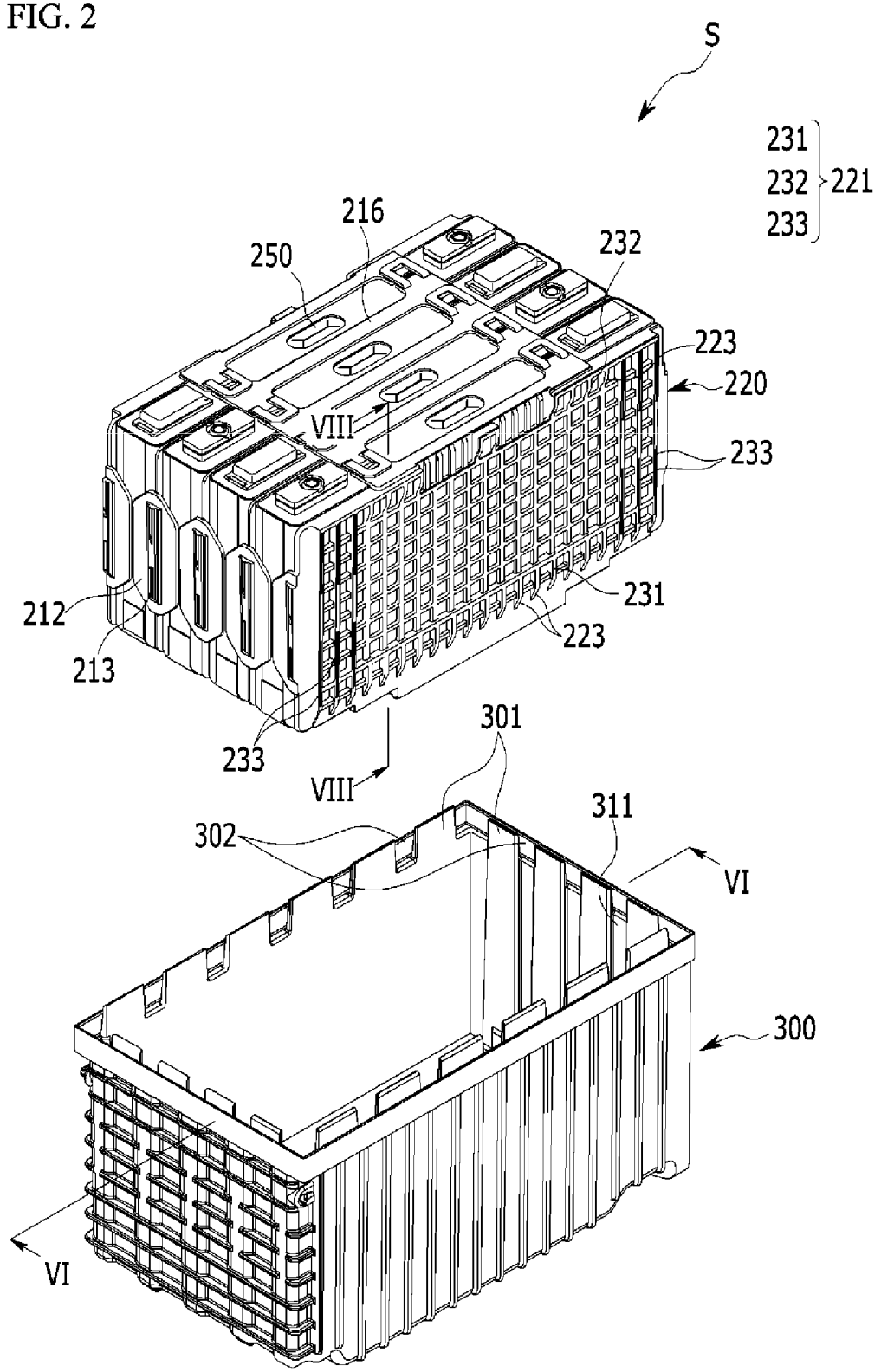
FIG. 2 is a perspective view illustrating a process of assembling a cell stack to a pack housing, following FIG. 1.
Figure 3:
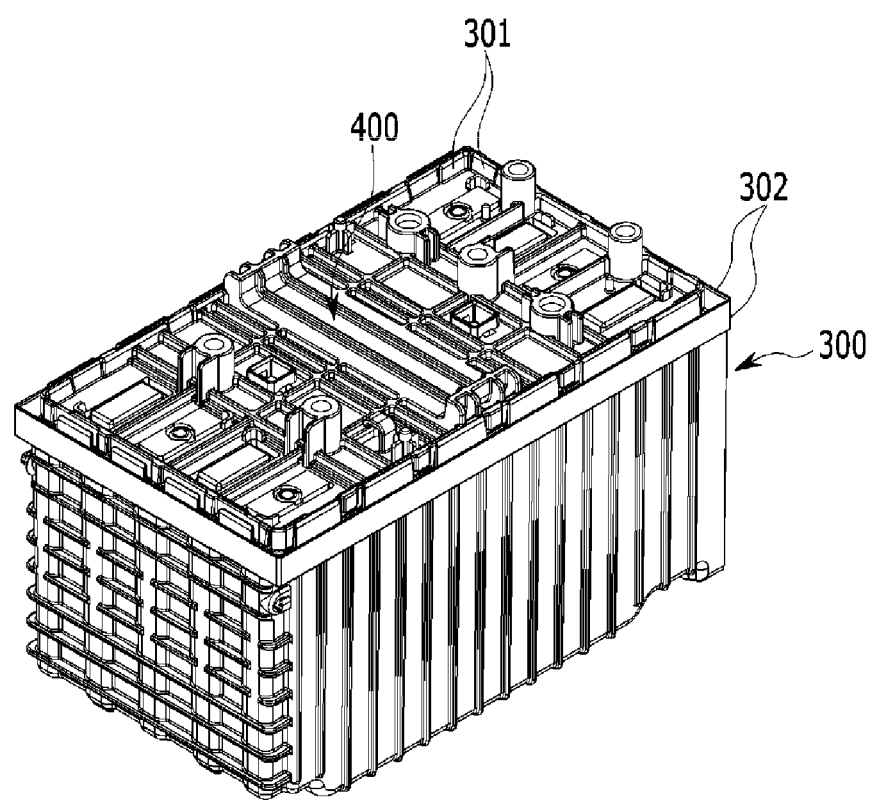
FIG. 3 illustrates a perspective view of the cell stack assembled to the pack housing, following FIG. 2.

FIG. 1 is a perspective view illustrating a cell-stacking process for manufacturing a rechargeable battery pack according to an exemplary embodiment of the present disclosure, FIG. 2 is a perspective view illustrating a process of assembling a cell stack to a pack housing, following FIG. 1, and FIG. 3 illustrates a perspective view of the cell stack assembled to the pack housing, following FIG. 2.

Referring to FIGS. 1 to 3, a rechargeable battery pack of an exemplary embodiment includes unit cells 100 consisting of a rechargeable battery, barriers 200 between respective ones of the unit cells 100, and a pack housing 300 for accommodating a cell stack (S) assembled with the unit cells 100 and the barriers 200.

The unit cells 100 are aligned and adjacent each other in a y-axis direction, and are electrically connected to each other by a bus bar. The barriers 200 are between respective ones of the unit cells 100, partially protrude outward from the unit cells 100, and are coupled to each other outside of the unit cells 100, thereby forming the cell stack (S).

The cell stack (S) may be formed by alternately stacking the unit cell(s) 100 and the barrier(s) 200 in the y-axis direction, and by coupling adjacent barriers 200 to each other outside of the unit cells 100. For example, the barriers 200 include a protrusion 201 and a hole 202, and may be coupled to each other in a snap-fit structure.

The rechargeable battery pack may be formed by accommodating the cell stack (S) in the pack housing 300, and by tight-fitting the barriers 200 in the pack housing 300 to be coupled thereto. For example, the pack housing 300 may be integrally formed to be fixedly connected to the barriers 200.

That is, due to the tight-fitting structure of, or the fixedly-connected structure of, the barriers 200 and the pack housing 300 in the rechargeable battery pack, a module frame otherwise used in the conventional art may be eliminated.

As such, in the rechargeable battery pack of the present embodiment, the barriers 200 between unit cells 100 are directly inserted into, and fixed to, the pack housing 300. Accordingly, the number of parts included in the rechargeable battery pack, the material costs thereof, and the weight thereof, may all decrease, and the manufacturing process may be simplified.

In other embodiments, an actual rechargeable battery pack is formed so that a front housing is coupled to the pack housing 300 of FIG. 3, and is bonded thereto (e.g., by laser welding, etc.)

Further, in the rechargeable battery pack of the present exemplary embodiment, the pack housing 300 may be formed of a synthetic resin, and may be directly mounted on, and used on, a battery tray of a hybrid vehicle and/or of an electric vehicle.

When the pack housing 300 formed of synthetic resin is compared with that formed of a conductive material, the pack housing 300 formed of the synthetic resin may implement electrical insulation, and may prevent vibration and impact from being transmitted to the rechargeable battery pack from an exterior thereof.

Figure 4:
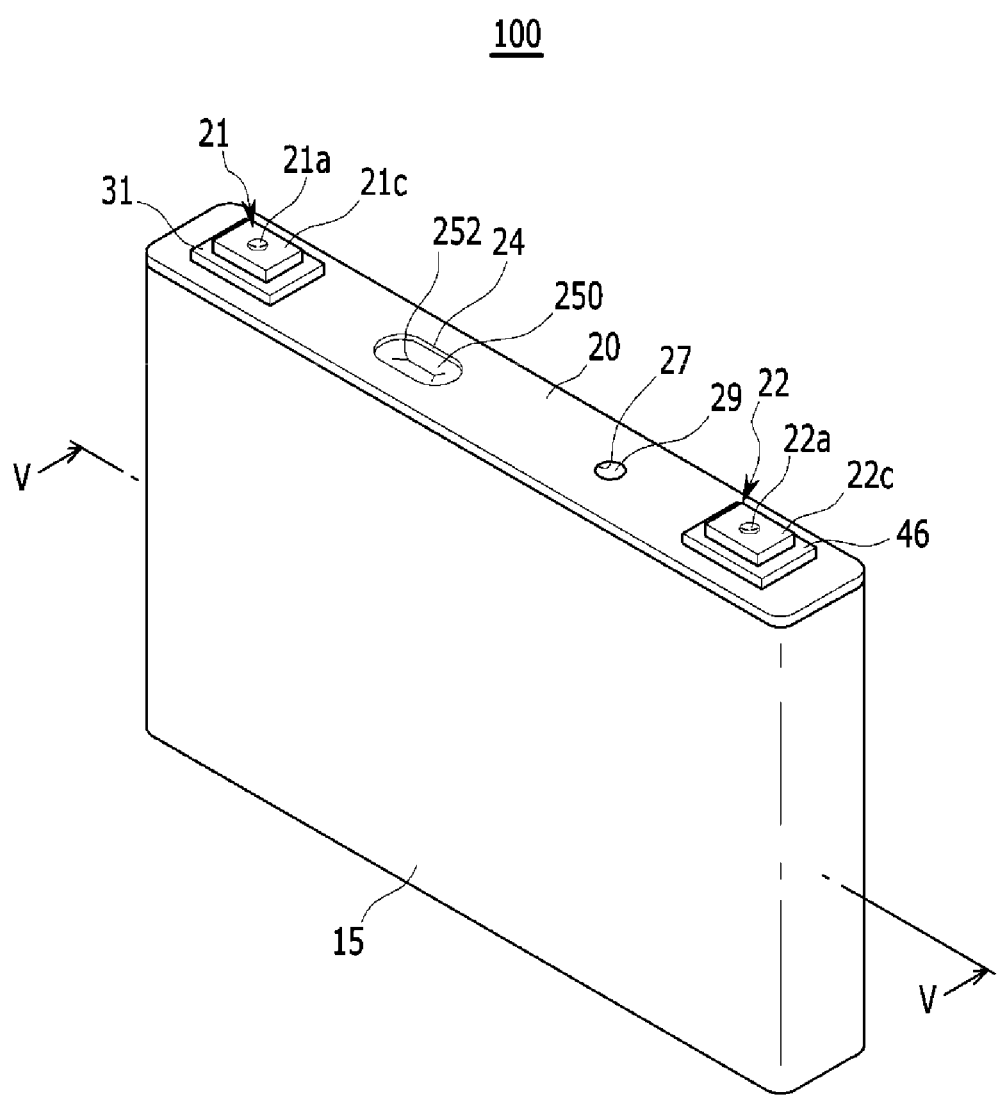
FIG. 4 illustrates a perspective view of a unit cell of FIG. 1.
Figure 5:
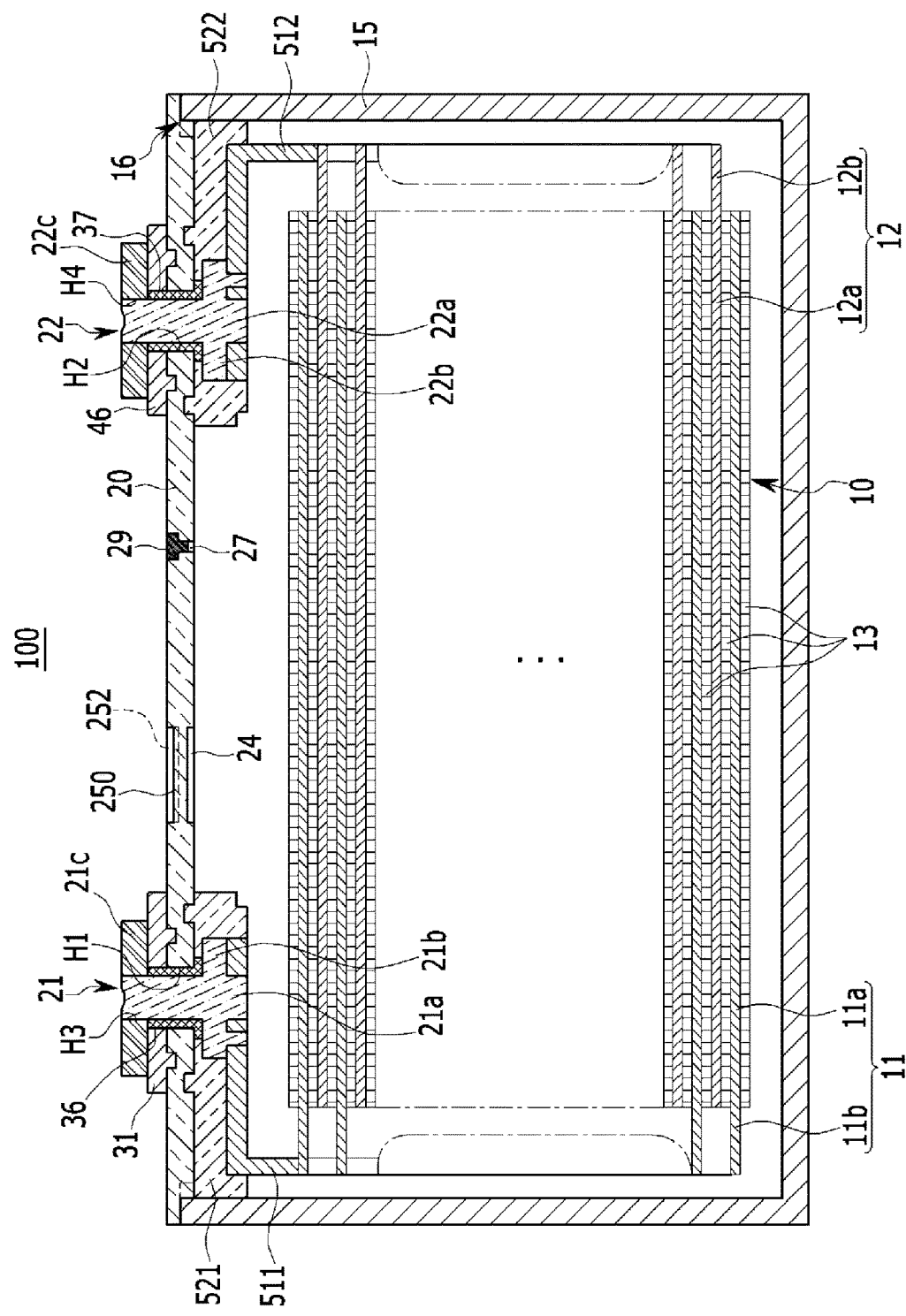
FIG. 5 illustrates a cross-sectional view taken along the line V-V of FIG. 4.

FIG. 4 illustrates a perspective view of a unit cell of FIG. 1, and FIG. 5 illustrates a cross-sectional view taken along the line V-V of FIG. 4.

Referring to FIGS. 4 and 5, the unit cell 100 includes an electrode assembly 10 for charging and discharging a current, a case 15 for accommodating the electrode assembly 10 and an electrolyte solution, a cap plate 20 for closing and sealing an opening 16 of the case 15, and first and second electrode terminals 21 and 22 in terminal holes H1 and H2 of the cap plate 20.

For example, the electrode assembly 10 may be formed by placing first and second electrodes (e.g., a negative electrode 11 and a positive electrode 12) at opposite surfaces of a separator 13, which is an insulator, and then spirally winding the negative electrode 11, the separator 13, and the positive electrode 12 in a jelly roll type electrode assembly 10.

The positive and negative electrodes 11 and 12 respectively include coated regions 11a and 12a, where an active material is coated on a current collector made of a metal plate, and respectively include uncoated regions 11b and 12b having exposed portions of the current collector on which the active material is not coated.

For example, the uncoated region 11b of the negative electrode 11 is at one end of the negative electrode. 11 along the spirally wound negative electrode 11. The uncoated region 12b of the positive electrode 12 is at one end of the positive electrode 12 along the spirally wound positive electrode 12. The uncoated regions 11b and 12b are respectively at opposite ends of the electrode assembly 10.

The case 15 is substantially formed as a cuboid, in which a space for accommodating the electrode assembly 10 is set. The opening 16 of the case 15 is formed at one side of the cuboid to allow the electrode assembly 10 to be inserted into an inner space of the case 15 from the outside.

The cap plate 20 is installed in the opening 16 of the case 15 to seal the opening 16. For example, the case 15 and the cap plate 20 may be formed of aluminum, such that the case 15 and the cap plate 20 may be welded to each other. That is, after the electrode assembly 10 is inserted into the case 15, the cap plate 20 may be welded to the case 15 at the opening 16 of the case 15.

In addition, the cap plate 20 may have one or more openings, for example the cap plate 20 may define terminal holes H1 and H2 and a vent hole 24. The first and second electrode terminals 21 and 22 may be respectively installed in the terminal holes H1 and H2 of the cap plate 20 to be electrically connected to the electrode assembly 10.

That is, the first and second electrode terminal 21 and 22 are respectively electrically connected to the negative electrode 11 and to the positive electrode 12 of the electrode assembly 10. Accordingly, the electrode assembly 10 may be drawn out of, or protrude from, the case 15 via the first and second electrode terminals 21 and 22. Further, in other embodiments, the first and second electrode terminals 21 and 22 may be respectively electrically connected to the positive and negative electrodes 12 and 11 of the electrode assembly 10.

The first and second electrode terminals 21 and 22 are electrically connected to the electrode assembly 10, and respectively include rivet terminals 21a and 22a that respectively pass through the terminal holes H1 and H2, and also respectively include plate terminals 21c and 22c at an exterior of the cap plate 20 to be fastened to the rivet terminal 21a and 22a.

The plate terminals 21c and 22c respectively define through-holes H3 and H4. The rivet terminals 21a and 22a upwardly pass through the terminal holes H1 and H2 and are then inserted into the through holes H3 and H4, respectively. The electrode terminals 21 and 22 further respectively include flanges 21b and 22b, which broadly extend from, and are integrally formed with, the rivet terminals 21a and 22a inside the cap plate 20.

At the first electrode terminal 21 connected to the negative electrode 11, an external insulating member 31 is interposed between the plate terminal 21c and the cap plate 20, and electrically insulates the plate terminal 21c from the cap plate 20. That is, the cap plate 20 remains electrically insulated from the electrode assembly 10 and the negative electrode 11.

The insulating member 31 and the plate terminal 21c are coupled to an upper end of the rivet terminal 21a, which may be riveted or welded such that the insulating member 31 and the plate terminal 21c are fastened to the upper end of the rivet terminal 21a. The plate terminal 21c is installed at the exterior of the cap plate 20 with the insulating member 31 therebetween.

At the electrode terminal 22 connected to the positive electrode 12, a conductive top plate 46 is interposed between the plate terminal 22c and the cap plate 20, and electrically connects the plate terminal 22c to the cap plate 20. That is, the cap plate 20 remains electrically connected to the positive terminal 12 of the electrode assembly 10.

The top plate 46 and the plate terminal 22c are coupled to the upper end of the rivet terminal 22a, which may be riveted or welded such that the top plate 46 and the plate terminal 22c are fastened to the upper end of the rivet terminal 22a. The plate terminal 22c is installed at the exterior of the cap plate 20 with the top plate 46 therebetween to be electrically connected to the cap plate 20.

Gaskets 36 and 37 are respectively between the rivet terminals 21a and 22a of the electrode terminals 21 and 22 and the inner surfaces that define the terminal holes H1 and H2 of the cap plate 20, to thereby respectively seal and electrically insulate the rivet terminals 21a and 22a from the cap plate 20.

The gasket 37 near the second electrode terminal 22 is interposed between the rivet terminal 22a and the top plate 46. Accordingly, the top plate 46 is not directly electrically connected to the rivet terminal 22a, but is electrically connected to the rivet terminal 22a through the plate terminal 22c.

The gaskets 36 and 37 are also respectively between the flanges 21b and 22b and an inner surface of the cap plate 20 to better seal and to respectively electrically insulate the flanges 21b and 22b from the cap plate 20. For example, the gaskets 36 and 37 allow the first and second electrode terminals 21 and 22 to be installed at the cap plate 20 while preventing the electrolyte from leaking through the terminal holes H1 and H2.

Lead tabs 511 and 512 respectively electrically connect the first and second electrode terminals 21 and 22 to the uncoated regions 11b and 12b of the negative and positive electrodes 11 and 12 of the electrode assembly 10. That is, the lead tabs 511 and 512 are respectively connected to the lower ends of the rivet terminals 21a and 22a, while being respectively supported by the flanges 21b and 22b, by respectively coupling the lead tabs 511 and 512 to the lower ends of the rivet terminals 21a and 22a to caulk the lower ends thereof.

Inner insulating members 521 and 522 are respectively installed between the lead tabs 511 and 512 and the cap plate 20 to electrically insulate the lead tabs 511 and 512 from the cap plate 20. In addition, the insulating members 521 and 522 are coupled to the cap plate 20, and respectively surround the lead tabs 511 and 512, the rivet terminals 21a and 22a, and the flanges 21b and 22b, thereby stabilizing the connection structure thereof.

The cap plate 20 also defines an electrolyte injection opening 27. After the cap plate 20 is combined to the case 15 and is welded thereto, the electrolyte injection opening 27 allows the electrolyte solution to be injected into the case 15. After injecting the electrolyte solution, the electrolyte injection opening 27 may be sealed by a sealing cap 29.

The vent hole 24 is configured to discharge a generated gas to reduce an internal pressure of the unit cell 100, and is closed and sealed by a vent plate 250. For example, the vent plate 250 is integrally formed with the cap plate 20 in the vent hole 24, and includes a notch 252 that is configured to be ruptured.

Figure 6:
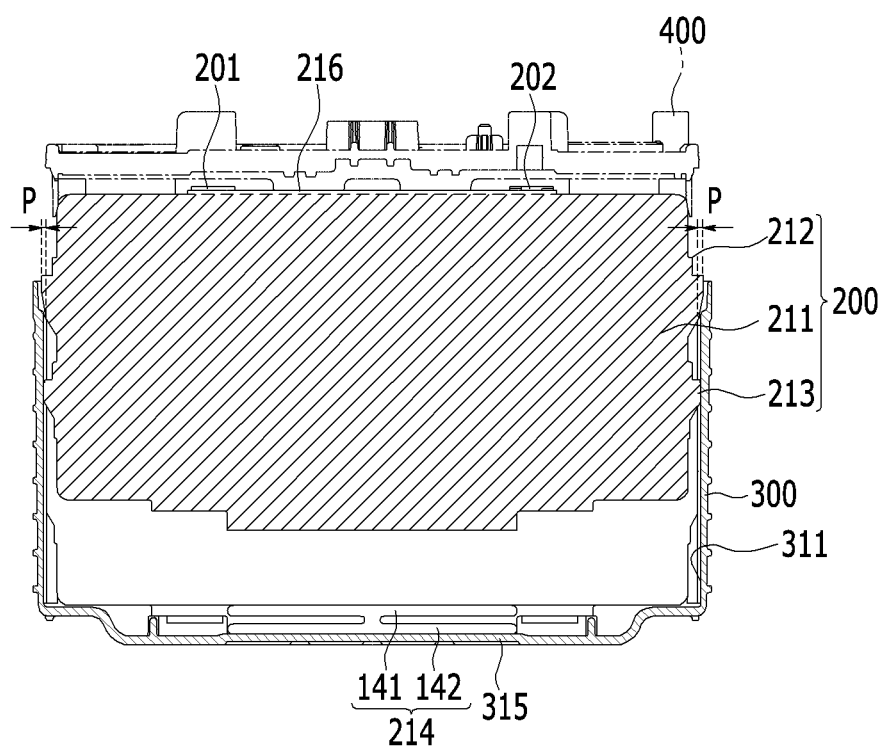
FIG. 6 illustrates a cross-sectional view before a cell stack is inserted into a pack housing taken along the line VI-VI of FIG. 2.
Figure 7:
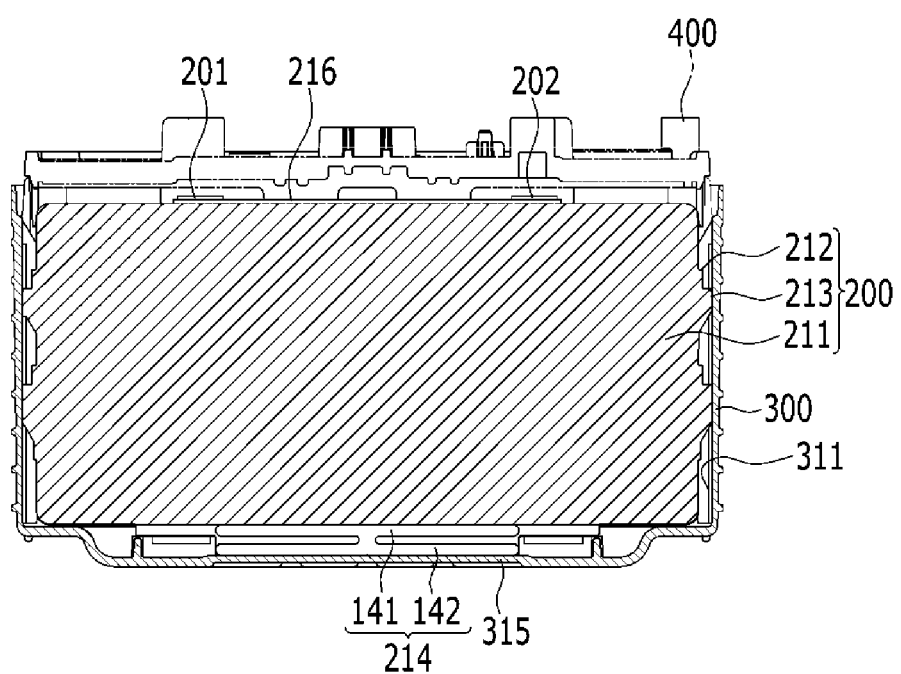
FIG. 7 illustrates a cross-sectional view after a cell stack is inserted into a pack housing taken along the line VI-VI of FIG. 2.

FIG. 6 illustrates a cross-sectional view before a cell stack is inserted into a pack housing taken along the line VI-VI of FIG. 2, and FIG. 7 illustrates a cross-sectional view after a cell stack is inserted into a pack housing taken along the line VI-VI of FIG. 2. Referring to FIGS. 1, 2, 6, and 7, the barrier 200 includes a main body 211 between the unit cells 100, side surface supporting portions 212 that are at opposite ends of the main body 211 and support outer surfaces of the opposite sides of the unit cell 100, and first plastic-deformed portions 213 that respectively protrude from the side surface supporting portions 212 to be plastic-deformed inside the pack housing 300.

The pack housing 300 includes guide grooves 311 at inner surfaces of the pack housing 300 in an insertion direction of the first plastic-deformed portion 213 to guide insertion of the first plastic-deformed portions 213. That is, when the cell stack (S) is inserted into the pack housing 300, the side surface supporting portions 212 of the barrier 200 are inserted to pass along the inner surfaces of the pack housing 300. In this case, the first plastic-deformed portions 213 are guided along, and are deformed by, the guide grooves 311 of the pack housing 300, such that the first plastic-deformed portions 213 are coupled to the guide groove 311 by tight-fitting.

That is, before the cell stack (S) is inserted in the pack housing 300, the first plastic-deformed portions 213 protrude out of the guide grooves 311, and after the cell stack (S) is inserted in the pack housing 300, the first plastic-deformed portions 213 are deformed by a portion (P) protruding out of the guide grooves 311, and the first plastic-deformed portions 213 are positioned and tight-fitted in the guide grooves 311.

The first plastic-deformed portions 213 may be divided into upper and lower sides, and may formed along the insertion direction in the side surface supporting portions 212. The divided first plastic-deformed portions 213 may be more tightly fitted in the guide grooves 311, and when the lower ends of the first plastic-deformed portions 213 have a gentle slope, the tight-fitting insertion may be easily guided and performed.

Figure 8:
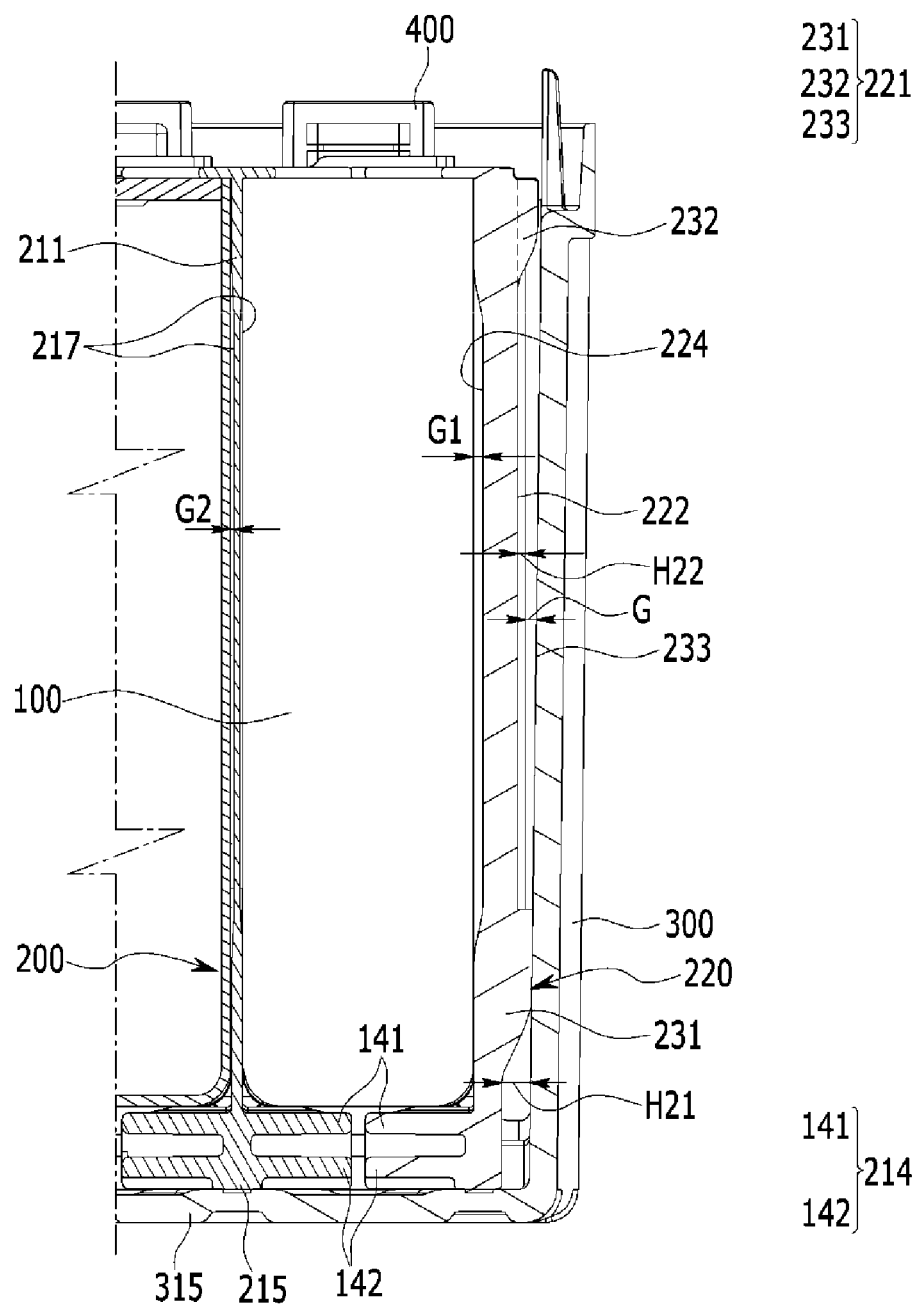
FIG. 8 illustrates a cross-sectional view taken along the line VIII-VIII of FIG. 2.

FIG. 8 illustrates a cross-sectional view taken along the line VIII-VIII of FIG. 2. Referring to FIG. 8, the main body 211 of the barrier 200 further includes an absorbing portion 217, which may be formed to be concave toward one side or toward opposite sides of the unit cell 100 in a swelling direction of the unit cell 100 (e.g., the absorbing portion 217 may be bowed inward in a direction opposite the swelling direction of the unit cell 100). The absorbing portion 217 allows each of the unit cells 100 to swell and deform into an air gap G2 spaced apart from the unit cell 100.

Referring to FIGS. 1, 2, and 8, an end barrier 220 supporting an outermost unit cell 100 is further included in the barriers 200. The end barrier 220 includes a supporting portion 221, which includes a downward deformed portion 231, an upward deformed portion 232, and a second plastic-deformed portion 233, and which protrudes in a swelling direction of the unit cell 100 to be supported and plastic-deformed toward the inner surface of the pack housing 300.

That is, when the cell stack (S) is inserted into the pack housing 300, the end barrier 220 is inserted along the inner surface of the pack housing 300. In this case, the supporting portion 221 is supported and plastic-deformed along the inner surface of the pack housing 300 to be tight-fitted and coupled thereto.

The end barrier 220 includes an end absorbing portion 222 for absorbing, or displacing, the swelling deformation of the unit cell 100 by having an air gap (G) that has a second height (e.g., a second distance) H22 that is less than a first height (e.g., a first distance) H21 of the supporting portion 221 at the inside (plane of the end barrier 220) of the supporting portion 221 to be spaced from the inner surface of the pack housing 300. That is, the air gap (G) is configured such that a distance between the end absorbing portion 222 and the pack housing 300 is greater at the first height H21 than at the second height H22.

That is, the end absorbing portion 222 spaced from the end barrier 220 by the second height H22 at the inside of the end barrier 220 in an x-y plane of FIG. 1, and the supporting portion 221 spaced from the end barrier 220 by the first height H21 at an outer portion of the end absorbing portion 222.

Accordingly, an expandable range of the end absorbing portion 222 of the end barrier 220 increases by having an air gap (G) at a center portion in which swelling, or expansion, of the unit cell 100 occurs. That is, the end barrier 220 is tight-fitted and coupled to the pack housing 300 by the supporting portion 221, and may accommodate expansion, or swelling deformation, of the unit cell 100.

Specifically, the supporting portion 221 includes a downward deformed portion 231 below the end absorbing portion 222, an upward deformed portion 232 above the end absorbing portion 222, and a second plastic-deformed portion 233 that is beside the end absorbing portion 222 and protrudes in a swelling direction of the unit cell 100 to be plastic-deformed in the inner surface of the pack housing 300.

That is, in the supporting portion 221, the downward and upward deformed portions 231 and 232 and the second plastic-deformed portion 233 are tight-fitted into the pack housing 300 at the outside at which the swelling deformation of the unit cell 100 is mainly generated, such that the swelling deformation of the unit cells 100 may be absorbed, or accommodated, in the end absorbing portion 222.

The supporting portion 221 has an inclined surface 223 (see FIG. 2) formed to be inclined in accordance with the first height H21 in an insertion direction with respect to an outer surface of the end barrier 220. Even though the supporting portion 221 protrudes from the end absorbing portion 222, when the cell stack (S) is inserted into the pack housing 300, the inclined surface 223 allows the supporting portion 221 of the end barrier 220 to be smoothly inserted without being caught in the opening of the pack housing 300.

The end barrier 220 further includes an absorbing portion 224 formed to be concave toward the outermost unit cell 100 in the swelling direction of the unit cell 100. The absorbing portion 224 forms an air gap G1 spaced from the outermost unit cell 100, thereby being able to absorb or accommodate the expansion, or swelling deformation, of the outermost unit cell 100.

The end absorbing portion 222 of the end barrier 220 may finally further absorb the swelling deformation that is not absorbed in, or accommodated by, the absorbing portions 217 and 224 corresponding to each of the unit cells 100. That is, the end absorbing portion 222 finally absorbs, or accommodates, the final swelling deformation of the cell stack (S) in the pack housing 300.

Figure 9:
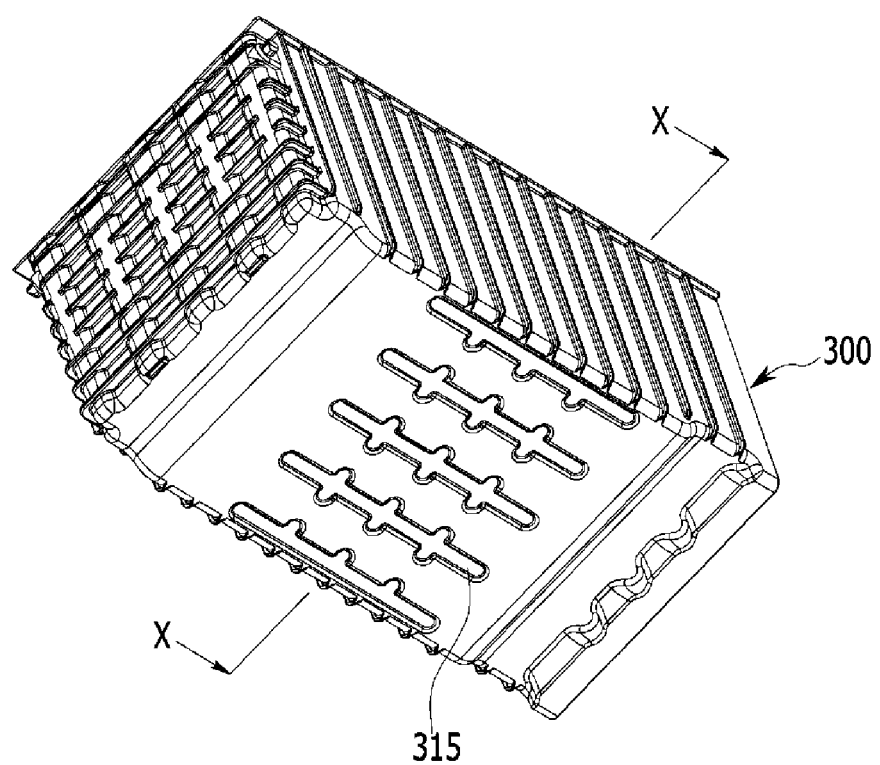
FIG. 9 illustrates a perspective view of a bottom portion of a rechargeable battery pack of FIG. 7.
Figure 10:
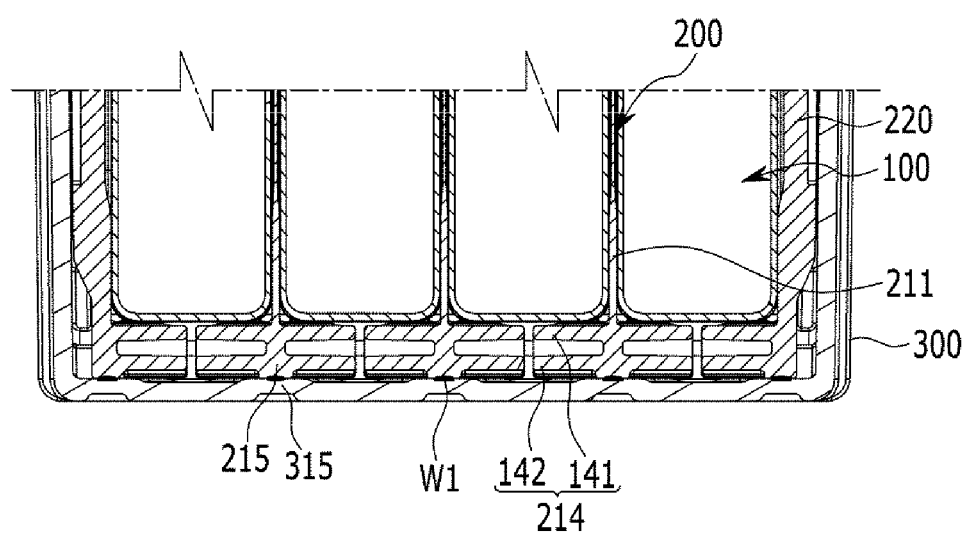
FIG. 10 illustrates a cross-sectional view taken along the line X-X of FIG. 9.

FIG. 9 illustrates a perspective view of a bottom portion of a rechargeable battery pack of FIG. 7, and FIG. 10 illustrates a cross-sectional view taken along the line X-X of FIG. 9.

Referring to FIGS. 6 to 10, the barrier 200 includes a bottom surface supporting portion 214 for supporting a downward outer surface of the unit cell 100, and includes a third plastic-deformed portion 215 that protrudes from the bottom surface supporting portion 214 to be plastic-deformed and fixed inside the pack housing 300.

The pack housing 300 includes a fixing portion 315 protruding toward the third plastic-deformed portion 215 from a bottom surface thereof to contact the third plastic-deformed portion 215. The fixing portion 315 is fixed to the third plastic-deformed portion 215 by welding.

The bottom surface supporting portion 214 includes a first supporting layer 141 contacting and supporting the bottom surface of the unit cell 100, and a second supporting layer 142 that is partially connected to the first supporting layer 141 to contact and support the pack housing 300.

The third plastic-deformed portion 215 is protruded toward the fixing portion 315 of the pack housing 300 from the second supporting layer 142. Accordingly, when the cell stack (S) is completely inserted into the pack housing 300, the third plastic-deformed portion 215 of the barrier 200 and the fixing portion 315 of the pack housing 300 contact each other.

When the barrier 200 and the pack housing 300 are formed of a synthetic resin, the third plastic-deformed portion 215 of the barrier 200 may be bonded to the fixing portion 315 of the pack housing 300 by laser-welding to form a first bonding portion W1.

Referring back to FIGS. 1 and 2, the barrier 200 further includes a top surface supporting portion 216 supporting the upper outer surface of the unit cell 100. The protrusion 201 and the hole 202 are located in opposite directions with respect to each other and protrude toward respective adjacent unit cells 100 at the top surface supporting portion 216.

Accordingly, the protrusion 201 and the hole 202 of one of the barriers 200 are respectively coupled to the hole 202 and the protrusion 201 of an adjacent barrier 200 in a snap-fit structure. In this case, the top surface supporting portion 216 defines an area around the vent hole 24 of the respective unit cell 100.

As such, even when the cell stack (S) is formed by the unit cells 100 and the barrier 200, the vent plate 250 of the unit cell 100 is exposed between the top surface supporting portions 216 of the adjacent barriers 200. Therefore, when the vent plate 250 is ruptured, and thus an internal pressure of the unit cell 100 is discharged through the vent hole 24, the top surface supporting portion 216 does not prevent the discharge of the internal pressure.

As shown in FIGS. 3, 6, 7, and 8, after the cell stack (S) is inserted into the pack housing 300, and a bus bar holder 400 is coupled to the opening of the pack housing 300, the rechargeable battery pack of the exemplary embodiment is partially completed by bonding the bus bar holder 400 and the pack housing 300.

Figure 11:
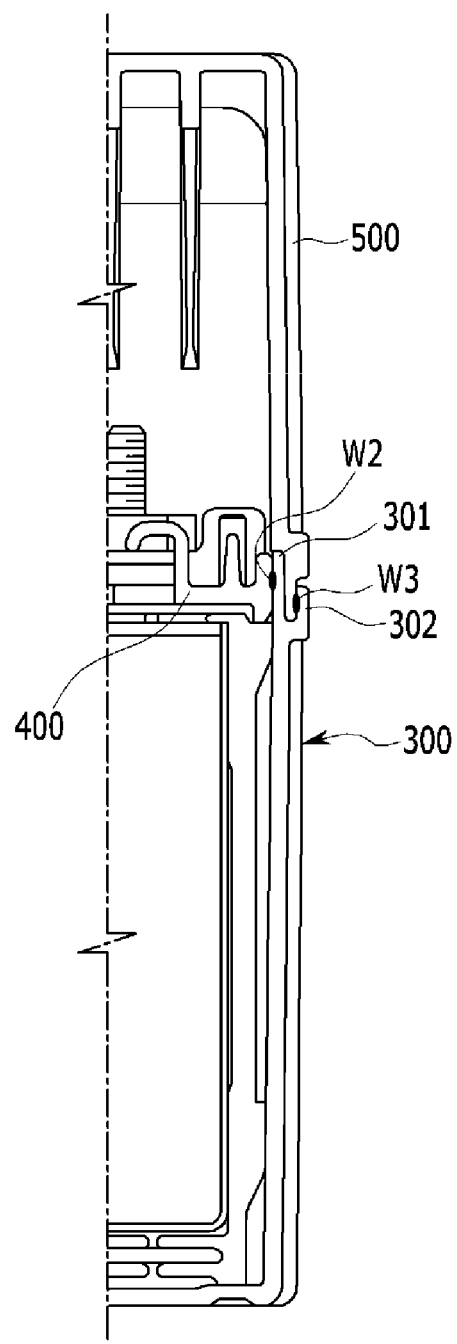
FIG. 11 illustrates a partial cross-sectional view of a housing cover assembled to the pack housing following FIG. 3.

FIG. 11 illustrates a partial cross-sectional view of a state in which a housing cover is further assembled to the pack housing following FIG. 3. Referring to FIGS. 2, 3, and 11, the pack housing 300 is formed as a dual structure of an inward protrusion 301 and an outward flange 302 near the opening thereof.

Accordingly, the inward protrusion 301 of the pack housing 300 may be bonded to the bus bar holder 400 by laser welding, such that the bus bar holder 400 forms a second bonding portion W2. Further, a plurality of inward protrusions 301 are formed to be spaced from the opening of the pack housing 300 by a predetermined pitch. The plurality of inward protrusions 301 closely contact the bus bar holder 400, thereby improving a close contacting property of the second bonding portion W2.

The pack housing 300 may be coupled to a housing cover 500 covering the bus bar holder 400. The housing cover 500 is coupled between the inward protrusion 301 and the outward flange 302 of the pack housing 300 to cover an upper portion of the bus bar holder 400, and is bonded to the outward flange 302 (e.g., by laser welding) to form a third bonding portion W3, thereby substantially completing the rechargeable battery pack together with the pack housing 300.

The pack housing 300, the bus bar holder 400, and the housing cover 500 may be formed of a synthetic resin to be able to be bonded to the first, second, and third bonding portions W1, W2, and W3 by laser welding. The laser welding is an exemplary embodiment that bonds the pack housing 300, the bus bar holder 400, and the housing cover 500, and it may be replaced by a bonding method or a thermal fusion method.

Compared with those formed of a conductive material, the pack housing 300 and housing cover 500, which accommodate the bus bar holder 400 formed of the synthetic resin, and which are then bonded to each other, may implement electrical insulation, and may reduce or prevent vibration and impact otherwise transmitted to the rechargeable battery pack from the outside, and may simplify a complicated assembly structure, and may effectively protect the unit cells 100.

In addition, according to the structure in which the pack housing 300, the bus bar holder 400, and the housing cover 500 are bonded by the laser welding, the number of parts of the rechargeable battery module, and the number of parts for fixing the rechargeable battery module to the rechargeable battery pack, may decrease, and the manufacturing process may be relatively simplified when compared with the conventional rechargeable battery pack. Therefore, the material costs, weight, and manufacturing costs may be reduced.

According to the structure in which the pack housing 300, the bus bar holder 400, and the housing cover 500 are bonded by the laser welding, it is possible to remove separate structures required to fix the rechargeable battery module in the rechargeable battery pack, and it is thus possible to reduce an inner space of the rechargeable battery pack.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims and their equivalents.

Description of Some of the Reference Characters

| | |
|---|---|
| 20: cap plate | 24: vent hole |
| 100: unit cell | 141: first supporting layer |
| 142: second supporting layer | 200: barrier |
| 201: protrusion | 202: hole |
| 211: main body | 212: side surface supporting portion |
| 213: first plastic-deformed portion | 214, 216: bottom, top surface supporting portion |
| 215: third plastic-deformed portion | 217, 224: absorbing portion |
| 220: end barrier | 221: supporting portion |
| 222: end absorbing portion | |
| 231, 232: downward, upward deformed portion | |
| 233: second plastic-deformed portion | 250: vent plate |
| 252: notch | 300: pack housing |
| 301: inward protrusion | 302: outward flange |
| 311: guide groove | 315: fixing portion |
| 400: bus bar holder | 500: housing cover |
| G, G1, G2: air gap | |
| W1, W2, W3: first, second, third bonding portion | |
| H21: first height | H22: second height |
| S: cell stack | |

What is claimed is:

1. A rechargeable battery pack comprising:
   unit cells each comprising a rechargeable battery;
   barriers coupled to each other at an outer circumference of the unit cells and each located between respective ones of the unit cells such that the unit cells and the barriers form a cell stack; and a pack housing that accommodates the unit cells and the barriers, and that is coupled to the barriers by tight-fitting, wherein the unit cells and the barriers, as the cell stack, are configured to be inserted into the pack housing.

2. The rechargeable battery pack of claim 1, wherein each of the barriers comprises:

a main body between the respective ones of the unit cells;

side surface supporting portions at opposite ends of the main body to support outer surfaces of opposite sides of the respective ones of the unit cells; and first plastic-deformed portions that respectively protrude from the side surface supporting portions to be plastic-deformed inside the pack housing.

3. The rechargeable battery pack of claim 2, wherein an inner surface of the pack housing defines a guide groove extending in an insertion direction of a respective one of the first plastic-deformed portions that is configured to guide insertion thereof.

4. The rechargeable battery pack of claim 2, wherein the main body comprises an absorbing portion that is concave toward a side of one of the unit cells in a swelling direction of the one of the unit cells, and that is configured to accommodate swelling deformation of the one of the unit cells into an air gap spaced from the one of the unit cells.

5. The rechargeable battery pack of claim 2, wherein the barriers comprise an end barrier for supporting an outermost unit cell of the unit cells, the end barrier comprising a supporting portion that protrudes in a swelling direction of the outermost unit cell, and that is configured to be plastic-deformed toward an inner surface of the pack housing.

6. The rechargeable battery pack of claim 5, wherein the end barrier comprises an end absorbing portion for accommodating swelling deformation of one of the unit cells that is at a second distance from an inner surface of the pack housing, the second distance being less than a first distance of the supporting portion from the inner surface of the pack housing.

7. The rechargeable battery pack of claim 6, wherein the end barrier comprises an absorbing portion that is concave toward the outermost unit cell to accommodate a swelling deformation of the outermost unit cell into an air gap adjacent the one of the unit cells.

8. The rechargeable battery pack of claim 6, wherein the supporting portion comprises:

a downward supporting portion below the end absorbing portion;

an upward supporting portion above the end absorbing portion; and a second plastic-deformed portion adjacent the end absorbing portion and protruding in a swelling direction of the one of the unit cells to be plastic-deformed within the pack housing.

9. The rechargeable battery pack of claim 8, wherein the supporting portion has an inclined surface that is inclined by the first distance in an insertion direction with respect to an outer surface of the end barrier.

10. The rechargeable battery pack of claim 2, wherein each of the barriers comprise:

a bottom surface supporting portion for supporting a downward outer surface of a corresponding one of the unit cells; and a third plastic-deformed portion that protrudes from the bottom surface supporting portion, and that is configured to be plastic-deformed to be fixed inside the pack housing.

11. The rechargeable battery pack of claim 10, wherein the pack housing comprises a fixing portion protruding toward the third plastic-deformed portion from a bottom surface thereof to contact the third plastic-deformed portion.

12. The rechargeable battery pack of claim 11, wherein the bottom surface supporting portion comprises:

a first supporting layer for contacting and supporting a bottom surface of the one of the unit cells; and a second supporting layer that is connected to the first supporting layer to contact and support the pack housing.

13. The rechargeable battery pack of claim 12, wherein the third plastic-deformed portion protrudes toward the fixing portion of the pack housing from the second supporting layer.

14. The rechargeable battery pack of claim 11, wherein the barriers and the pack housing comprise a synthetic resin, and wherein the third plastic-deformed portion of each of the barriers is bonded to the fixing portion to form a first bonding portion.

15. The rechargeable battery pack of claim 1, wherein the pack housing is integrally formed to be fixedly connected to the barriers.

16. The rechargeable battery pack of claim 1, further comprising:

a bus bar holder coupled to the pack housing to cover the unit cells and comprising a synthetic resin; and a housing cover coupled to an outside of the bus bar holder and to the pack housing and comprising a synthetic resin, wherein the bus bar holder is bonded to an inward protrusion of the pack housing to form a second bonding portion, and wherein the housing cover is bonded to an outward flange of the pack housing to form a third bonding portion.

17. The rechargeable battery pack of claim 1, wherein the pack housing is configured to be directly mounted on a hybrid vehicle or to an electric vehicle.

18. A rechargeable battery pack comprising:

unit cells each comprising a rechargeable battery;

barriers between respective ones of the unit cells and coupled to each other at an outer circumference of the unit cells; and a pack housing that accommodates a cell stack comprising the unit cells and the barriers and is bonded to the barriers, wherein the unit cells and the barriers, as the cell stack, are configured to be inserted into the pack housing.

19. The rechargeable battery pack of claim 18, wherein the barriers and the pack housing comprise a synthetic resin, and are bonded to each other to form a first bonding portion.

20. The rechargeable battery pack of claim 18, further comprising:

a bus bar holder that is coupled to the pack housing to cover the unit cells and that comprises a synthetic resin; and a housing cover that is coupled to an outside of the bus bar holder and to the pack housing and that comprises a synthetic resin, wherein the bus bar holder is bonded to an inward protrusion of the pack housing to form a second bonding portion, and wherein the housing cover is bonded to an outward flange of the pack housing to form a third bonding portion.

* * * * *